US005241393A

United States Patent [19]

Maresca

[11] Patent Number: 5,241,393
[45] Date of Patent: Aug. 31, 1993

[54] CATHODE-RAY TUBE HAVING IMPLOSION PROTECTION BAND

[75] Inventor: Alfredo Maresca, Rome, Italy

[73] Assignee: Videocolor S.P.A., Anagni, Italy

[21] Appl. No.: 630,607

[22] Filed: Dec. 20, 1990

[51] Int. Cl.[5] .... H04N 5/65
[52] U.S. Cl. .... 358/246; 358/248
[58] Field of Search .... 358/246, 248, 249

[56] References Cited

U.S. PATENT DOCUMENTS

| | | | |
|---|---|---|---|
| 4,360,837 | 11/1982 | Kreidler et al. | 358/246 |
| 4,701,802 | 10/1987 | Omae et al. | 358/246 |
| 5,055,934 | 10/1991 | Swank | 358/246 |

FOREIGN PATENT DOCUMENTS

| | | |
|---|---|---|
| 0258946 | 3/1988 | European Pat. Off. . |
| 1146078 | 6/1966 | United Kingdom . |
| 1158198 | 7/1969 | United Kingdom . |

*Primary Examiner*—Edward L. Coles, Sr.
*Attorney, Agent, or Firm*—J. S. Tripoli; E. P. Herrmann; L. L. Hallacher

[57] ABSTRACT

An improved cathode ray tube has a shrink-fit implosion protection band surrounding a portion of the tube envelope. The band includes a plurality of lugs for supporting the tube. The improvement comprises the band including a plurality of embossments arranged around the band. The embossments extend outwardly from the tube for a preselected distance to form cavities between the tube envelope and the embossments. The embossments include smooth outer surfaces to which the lugs are attached by welds. The embossments have indentations at the locations of the welds that extend into the cavities. The cavities have depths greater than the depths of penetration of the indentations into the cavities. By utilizing the embossments, the indentations, caused by welding, remain out of contact with the tube envelope.

4 Claims, 2 Drawing Sheets

CATHODE-RAY TUBE HAVING IMPLOSION PROTECTION BAND

BACKGROUND

This invention relates to cathode-ray tubes (CRT's) having implosion protection bands.

Cathode-ray tubes include glass envelopes that are evacuated to a very low internal pressure and accordingly, are subject to the possibility of implosion due to the stresses produced by atmospheric pressure acting on the exterior surface of the tube. This problem has been addressed in the art by providing the tubes with implosion protection bands. Such bands are used to apply a compressive force to the sidewalls of the faceplate panel of a tube to redistribute some of the faceplate panel forces. The redistribution of the faceplate panel forces decreases the probability of an implosion of the tube by minimizing tension in the corners of the faceplate panel. Implosion protection bands are also beneficial because they improve the impact resistance of the tube. Glass in compression is stronger than glass which is not in compression. The band causes compression in faceplate panel areas which otherwise are in tension. Additionally, in the event of an implosion the redistributed stresses cause the imploding glass to be directed toward the back of a cabinet in which the tube is mounted, thereby substantially reducing the probability of someone in the vicinity of the imploding tube being injured.

Implosion protection bands of the shrink fit type typically are manufactured by forming a strip of steel into a loop having the same configuration as the faceplate of the tube to be protected and by joining the two ends of the strip on one side of the loop. In some instances, the band is made by joining two identical strips on two sides of the loops. For both types of bands, the periphery of the loop is slightly smaller than the periphery of the faceplate. The loop is heated to a temperature in the range of approximately 300° to 500° C. and the coefficient of expansion of the material causes the loop to expand to dimensions permitting the loop to be slipped around the sidewalls of the faceplate. As the band cools it shrinks and tightly surrounds the faceplate, thereby applying the necessary implosion protection compression to the faceplate sidewalls. The compressive force can be accurately controlled by accurately dimensioning the band because the coefficient of expansion of the banding material is known.

Typically the implosion protection bands also serve the function of supporting mounting lugs which are used to mount the tube in a cabinet. The mounting lugs are permanently affixed to the implosion protection band in a convenient manner, usually welding. One type of mounting lug is a flat piece having one smooth edge. The smooth edge of the mounting lug is pressed against the outside surface of the band and the mounting lug is welded at selected points along the outside surface of the band. Problems sometime arise with this type of implosion protection band/mounting lug combination because the welding causes the formation of indentations in the band. The indentations contact the tube glass and in some instances chip the glass, thereby substantially increasing the probability of an implosion of the tube. For this reason there is a need for an implosion protection band/mounting lug structure which prevents the indentations from contacting the tube glass. The present invention fulfills this need.

SUMMARY

An improved cathode-ray tube has a shrink-fit implosion protection band surrounding a portion of an envelope thereof. The band includes a plurality of lugs for supporting the tube. The improvement comprises the band including a plurality of embossments arranged around the band. The embossments extend outwardly from the tube for a preselected distance to form cavities between the tube envelope and the embossments. The embossments include smooth outer surfaces to which the lugs are attached by welds. The embossments have indentations at the locations of the welds that extend into the cavities. The cavities have depths greater than the depths of penetration of the indentations into the cavities. By utilizing the embossments, the indentations, caused by welding, remain out of contact with the tube envelope.

DETAILED DESCRIPTION

Figure 1:
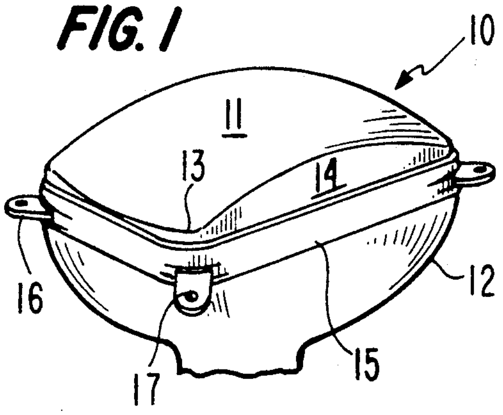
FIG. 1 shows a CRT having a novel implosion protection band and lug.

In FIG. 1, a cathode-ray tube (CRT) 10 includes a glass envelope comprising a faceplate panel 11 and a funnel 12 which are hermetically joined, and a shrink fit implosion protection band 15. The tube 10 is evacuated to a very low pressure, and therefore atmospheric pressure has a tendency to compress and implode the tube. However, the faceplate panel 11 has rounded corners 13 and substantially flat sidewalls 14. For this reason, the action of atmospheric pressure on the panel 11 causes tension forces in the vicinity of the corners 13 and along the junction where the flat sidewalls 14 join the front surface of the panel 11. Glass is very strong in compression but weak in tension. Accordingly, the strength of the evacuated tube is enhanced by placing the implosion protection band 15 around the faceplate panel, and particularly in contact with the flat sidewalls 14. The implosion protection band 15 is fitted tightly around the panel 11 to apply an additional compressive force to the sidewalls 14. The tension forces, which normally occur at the rounded corners 13 and at the junction of the sidewalls and the front surface of the panel, are changed to compression forces by the band and the entire tube envelope is subject to compression forces to maximize the strength of the tube envelope.

Figure 2:
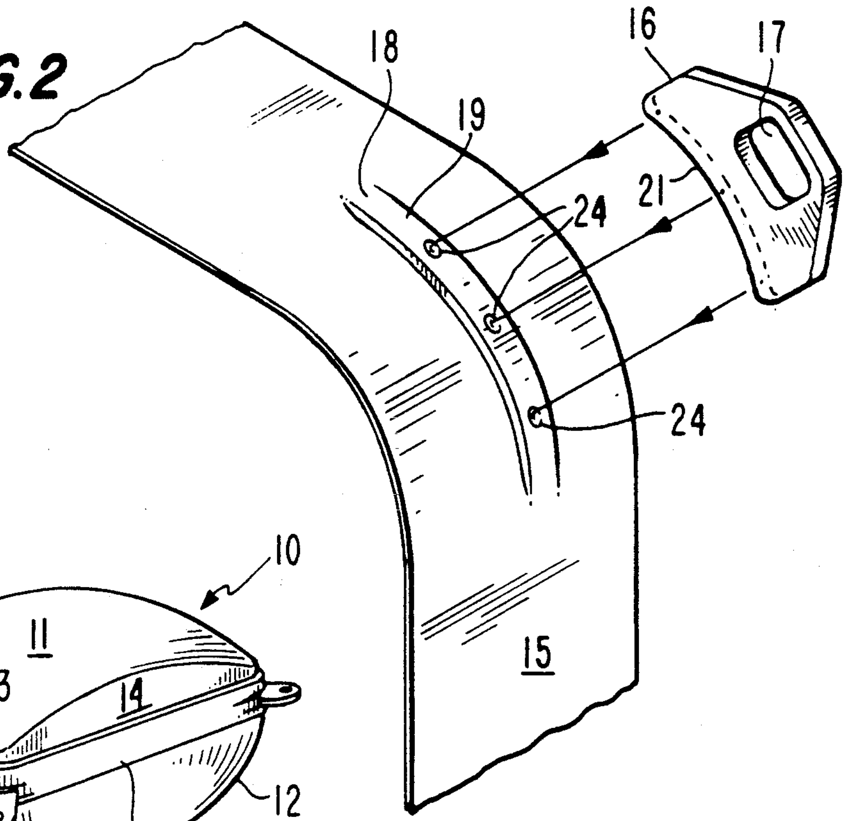
FIG. 2 is an exploded partial view of the novel implosion band and lug.
Figure 3:
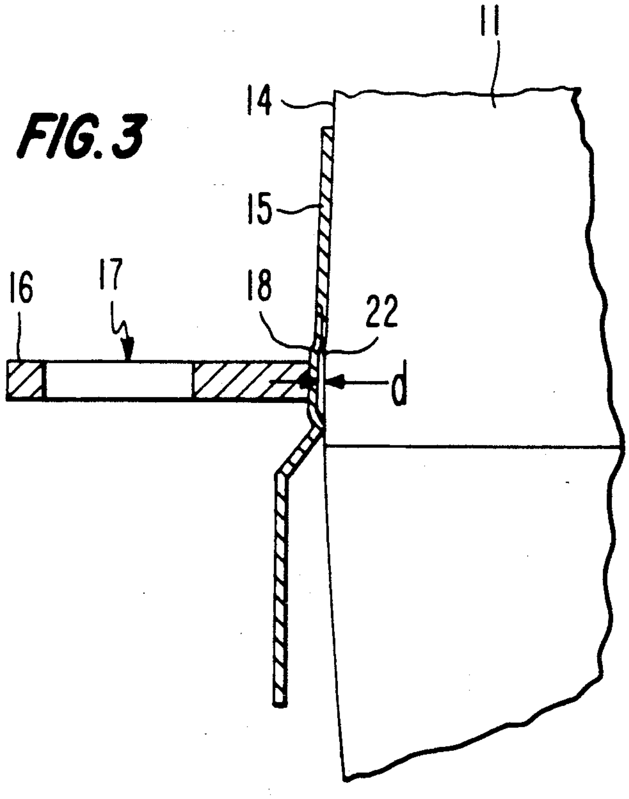
FIG. 3 is a cross section of the implosion band and lug of FIG. 2.
Figure 4:
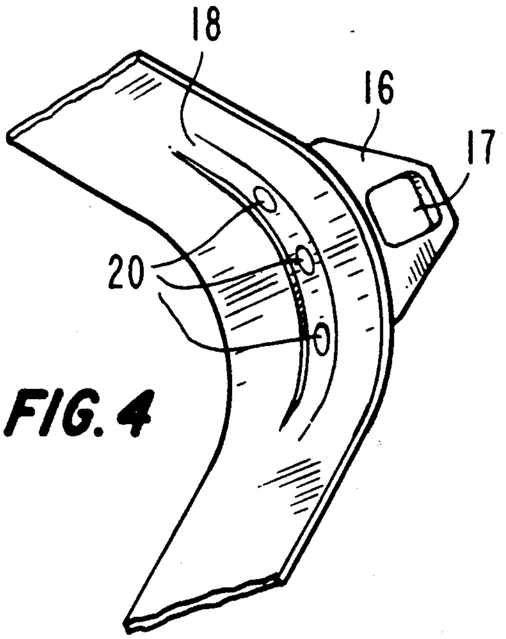
FIG. 4 is a perspective view of the implosion band and lug of FIG. 2 shown from the inside of the band.

The presence of the implosion protection band 15 provides a convenient mechanism for affixing a plurality of mounting lugs 16 to the tube 10. The mounting lugs 16 contain holes 17 which receive mounting studs set into a cabinet, in which the tube 10 is to be placed, to firmly mount the tube 10 in the cabinet. FIGS. 2, 3 and 4 show the implosion band 15 and lugs 16 in greater detail.

In FIGS. 2 and 3, the shrink-fit type implosion protection band 15 includes an embossment 18 which forms a cavity 22 having a depth "d" (FIG. 3). The embossment 18 includes a smooth outer surface 19 and the lug 16 has an edge 21 which is shaped similarly to the smooth surface 19. During welding, the edge 21 is held against the smooth surface 19 of the embossment 18 and the lug 16 is welded to the embossment 18 at selected positions 24 along the junction of the surface 19 and the edge surface of the lug 16. The welding causes the formation of indentations 20 (FIG. 4) which extend into the cavity 22. The depth "d" of the cavity 22 is sufficient to prevent the indentations from contacting the glass sidewall 14 of the panel 11 when the implosion protection band 15 is shrink fitted to the tube 10.

In the tube 10, the mounting lugs 16 are located at the rounded corners 13 of the tube. For this type of tube, the corners of the implosion protection band 15, and hence also of the embossments 18 and the edges 21 of the lugs 16, are configured similarly to the corners 13 of the tube 10 to allow full contact between the embossment surfaces 19 and the lug edges 21, to thereby strengthen the welding of the lugs to the embossments.

Figure 5:
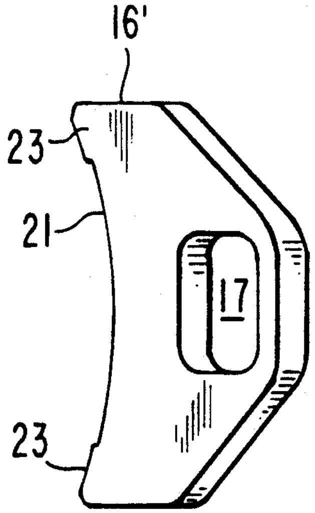
FIG. 5 is perspective view of another lug.

FIG. 5 is another preferred embodiment a lug 16. The FIG. 5 embodiment differs from the FIG. 2 embodiment in that the lug 16' includes tabs 23. When welded, the welds extend the full length of the tabs 23 and preferably are made on both sides of the lug. The tabs are used to define the length of the welds at the edges of the lug 16'.

What is claimed is:

1. In a cathode-ray tube having a shrink-fit implosion protection band surrounding a portion of an envelope thereof; said band having a plurality of lugs for supporting said tube, an improvement comprising:

said band including a plurality of embossments arranged around said band, said embossments being arranged between the edges of said band to partially span the width of said band, said embossments extending outwardly from said tube for a preselected distance to form cavities between said tube envelope and said embossments, said embossments including smooth outer surfaces to which said lugs are attached by welds, said embossments having indentations at the locations of said welds that extend into said cavities, and said cavities having depths greater than the depths of penetration of said indentations into said cavities, whereby said indentations remain out of contact with said tube envelope.

2. The tube of claim 1, wherein said tube envelope includes a rectangular faceplate panel and said embossments are arranged in the proximity of the corners of said faceplate panel.

3. The tube of claim 2, wherein said embossments and the edges of said lugs are curved similarly to the corners of said faceplate panel and wherein there is full contact between said embossments and the edges of said lugs.

4. The tube of claim 3, wherein each of said lugs includes at least one tab for defining the length of a weld along said lug.

* * * * *